Aug. 13, 1963     E. C. PROCTER     3,100,369
FORAGE HARVESTER
Filed May 24, 1961     2 Sheets-Sheet 1
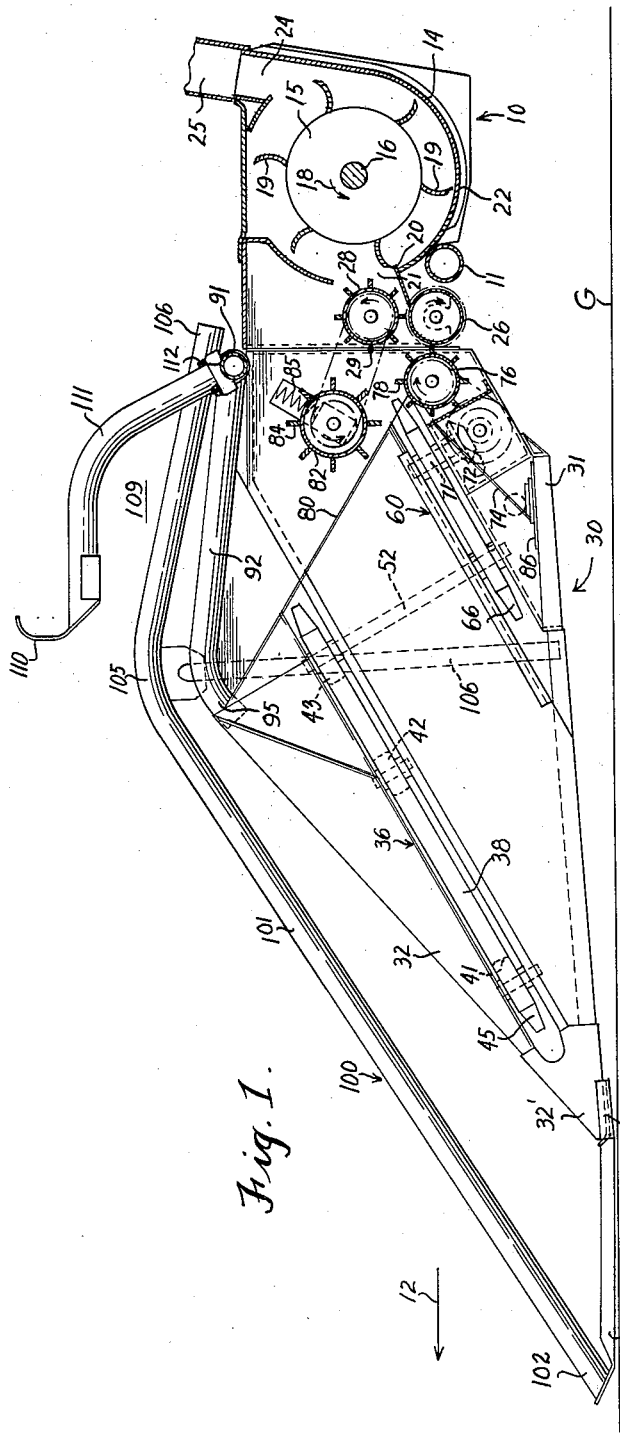
INVENTOR.
EDWARD C. PROCTER
BY
Joseph A. Brown
ATTORNEY

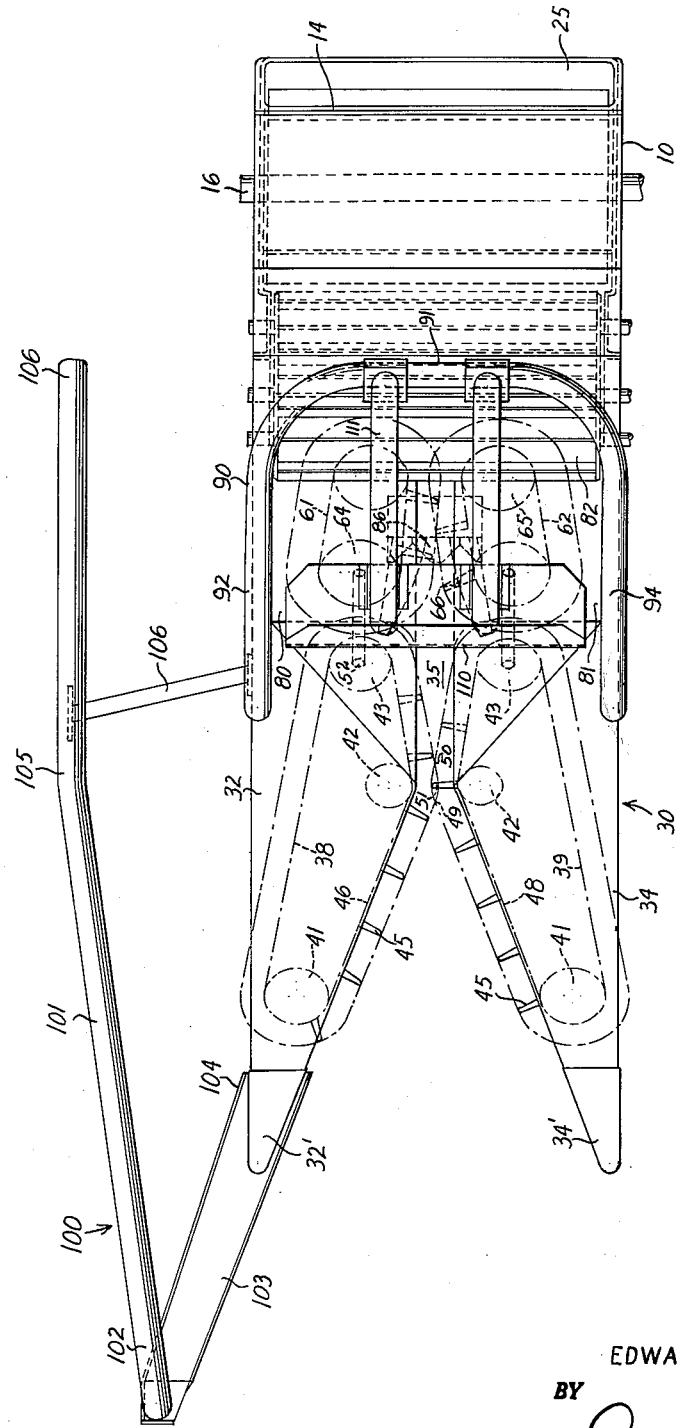

United States Patent Office 3,100,369
Patented Aug. 13, 1963

3,100,369
FORAGE HARVESTER
Edward C. Procter, New Holland, Pa., assignor to Sperry Rand Corporation, New Holland, Pa., a corporation of Delaware
Filed May 24, 1961, Ser. No. 112,256
7 Claims. (Cl. 56—16)

It is conventional to provide corn pickers and forage harvesters having row crop attachments with means for guiding crop material into choppers or other mechanism of the machines. However, the guide means employed heretofore has sometimes experienced difficulties with certain crop conditions, particularly where the crop is unusually tall or knocked down and tangled.

A main object of this invention is to provide in a forage harvester, a row crop feeding arrangement having components so related to each other that the infeed of material is facilitated and having operating characteristics superior to similar arrangements of prior design.

Another object of this invention is to provide in an implement, a row crop feeding arrangement having an infeed roll so located that it is free to receive and grasp material delivered to it from a plurality of directions, including from a rearward direction relative to the direction of travel of the machine.

Another object of this invention is to provide an improved down crop attachment capable of separating the rows of badly tangled and down crops and for guiding the material, after it has been separated, into the harvester.

Another object of this invention is to provide an improved down crop attachment so constructed and related to the harvester, that the ground speed of the machine does not have to be reduced when the attachment is in use.

A further object of this invention is to provide, in a feeding arrangement of the character described, a stalk bumper so positionable that the passage of crop material to an infeed roll is free and unobstructed.

A still further object of this invention is to provide simplified means for mounting a stalk bumper on a supporting tube whereby the bumper may be both axially and angularly adjusted and the bumper support structure employed occupies a minimum of space.

Other objects of this invention will be apparent hereinafter from the specification and from the recital in the appended claims.

In the drawings:

FIG. 1 is a part side elevation, part longitudinal vertical medial section through a forage harvester and row crop attachment having guide and infeed means constructed according to this invention;

FIG. 2 is a generally diagrammatic plan view of the structure shown in FIG. 1;

FIG. 3 is a fragmentary view on an enlarged scale showing the means employed for adjustably mounting the stalk bumper of the guide means;

FIG. 4 is a section taken on the line 4—4 of FIG. 3 looking in the direction of the arrows; and FIG. 5 is a section taken on the line 5—5 of FIG. 3 looking in the direction of the arrows.

Referring now to the drawings by numerals of reference, and particularly FIGS. 1 and 2, 10 denotes a forage harvester base unit carried on a frame 11 for ground movement forwardly as indicated by the arrow 12 in FIG. 1. The harvester may be either self-propelled or towed by a tractor. The base unit 10 comprises a housing 14 in which a rotary cutter 15 is operable. Cutter 15 has a transverse shaft 16 rotatable in a direction indicated by the arrow 18 in FIG. 1. A plurality of axially extending radially projecting knives 19 are provided which on rotation of the cutter move past a stationary shear bar 20 to chop and throw crop material fed into the housing 14. The material enters through a forwardly directed inlet opening 21. After the material is severed, it is swept downwardly and rearwardly along the arcuate bottom 22 of housing 14 and thrown upwardly and outwardly through discharge opening 24. After discharge, the material passes through a spout 25 to a trailing wagon or the like which receives the material.

The crop material fed through forward opening 21 in base unit 10 first passes between a pair of cooperative infeed rolls, namely, lower roll 26 and upper roll 28. The lower roll 26 is smooth and rotates in a clockwise direction when viewed as shown in FIG. 1. Upper roll 28 rotates in a counterclockwise direction and has transverse slats or ribs 29 to provide an aggressive infeed action on the material fed toward and through opening 21.

Mounted in front of base unit 10 is a row crop attachment 30 which comprises a frame structure 31 on which a pair of divider members 32 and 34 are mounted. These dividers are generally triangular when viewed in plan, FIG. 2, being widely spaced apart at their forward ends 32'—34' and converging as they extend rearwardly to a point where they extend parallel to each other to provide a fore-and-aft extending vertical inlet passage 35. When the harvester travels forwardly, the dividers 32 and 34 pass on opposite sides of the standing corn or other crop material and the material moves into the passage 35 for feeding into the base unit 10 through the opening 21.

For feeding the crop material, a first gathering means or unit 36 is mounted on the forward end of frame 31. Unit 36 comprises a pair of cooperative gathering chains 38 and 39, the chain 38 being operative on the divider 32 and chain 39 on the divider 34. Each chain passes around three sprockets 41, 42 and 43. Each of the chains has outwardly extending gathering fingers 45 which are projectable through suitable slots in the dividers. The chains 38 and 39 have infeed reaches 46 and 48, respectively, having fingers 45 which converge rearwardly and cross at a grip point 49, overlap for a short distance indicated by the section 51, and then diverge at a release point 50.

The forward gathering chain means 36 extends upwardly and rearwardly relative to the direction of travel of the harvester, FIG. 1. When viewed in plan, gathering chain 38 moves in a counterclockwise direction while the gathering chain 39 moves clockwise. The fingers 45 are so arranged that they successively pass across section 51. The drive for the gathering chains is through shafts 52 to the sprockets 43 and may be from any suitable source of power not shown. The infeed reaches 46 and 48 of the gathering chains should travel at a linear speed at least substantially as fast as the fastest ground speed of the harvester.

Rearwardly of the first gathering chain unit 36 is a second gathering chain means or unit 60 also mounted on the attachment 30. Unit 60 comprises a pair of gathering chain elements 61 and 62 which travel around sprockets 64 and 65. The chain 61 operates on divider 32 and chain 62 on the divider 34. The chains rotate in opposite directions and have fingers 66 which are projected outwardly of the dividers and cooperate to exert an infeed action on engaged crop material. Unit 60 extends parallel to unit 36 and the operative length of unit 60 is about half the operative length of the unit 36. The rear sprockets 65 of the gathering chains 61 and 62 have a shaft 71 (FIG. 1) which projects downwardly and have driven pinions 72 connected thereto and adapted to receive power from a source not shown. The sprockets 64 are rotated by the chain connection with the sprockets 65, and sprockets 64 are connected to the lower ends of the drive shafts 52 to thereby transmit power to the sprockets 43 and thus the forward gathering unit. The sprocket ratio is such that the second or rear gathering unit is operated at a speed faster than the speed of operation of the first or forward gathering unit.

Located beneath unit 60 is a trough or pan 74 which is inclined upwardly and rearwardly. Trough 74 forms an inclined ramp over which the butt or lower ends of the crop material may slide. The upper rearward end of ramp 74 is proximate to a stripper roll 76 as shown in FIG. 1, having peripheral slats or ribs 78 which engage the material as it comes from the ramp 74 and feeds it toward the infeed rolls 26 and 28. Roll 76 is so disposed that the slats 78 wipe over the fingers 66 on the gathering chains 61 and 62 to thereby strip crop material, weeds and the like therefrom and feed it to the infeed rolls 26 and 28.

The dividers 32 and 34 are provided with forwardly and upwardly inclined rear table portions 80 and 81, respectively, to support the corn or other crop material which has been delivered by the gathering unit. The fingers 66 on delivering the crop material rearwardly laterally distribute the material onto these tables. Operative above tables 80 and 81 and passage 35 is an infeed roll 82. Roll 82 has slats 84 which sweep downwardly and rearwardly over the passage 35 and across the surfaces of the tables 80 and 81. Being located above and forward of the release area of the second gathering unit 60, the roll 82 prevents the crop material from tipping upwardly and escaping from the attachment after it has been released by unit 60 and before it is engaged by the infeed rolls 26 and 28. Infeed roll 82 extends substantially all the way across tables 80 and 81 and upon counterclockwise rotation exerts the desired downward and rearward feed on the crop material. If an overload condition is created, the roll 82 is adapted to move upwardly and away from the tables 81 and 82 against the resistance of the hold-down spring means 85.

To sever the crop material from the ground G, a sickle 86 is provided and reciprocably mounted on the frame 31 beneath the lower forward end of the gathering unit 60. Sickle 86 extends across the lower portion of the infeed passage 35 and comprises conventional reciprocable knife elements. The sickle is driven from a source of power not shown.

In operation, when the harvester travels forwardly as indicated by the arrow 12 in FIG. 1, the gathering chains of the forward gathering unit 36 grip the corn or other crop material and convey it rearwardly to the grip point 49. The crop material is positively conveyed rearwardly by the chains 38 and 39 and across the section 51 where the fingers 45 cross. The crop material is released at the point 50 where the gathering chain fingers diverge. Thus, the crop material is released only a short distance after a gripping takes place. The linear speed of the infeed reaches 46 and 48 is generally faster than the ground speed of the harvester. If the crop material is bent downwardly and forwardly, the rapid speed of the gathering chains will pull it erect and then quickly release it. Subsequent to the time that the crop material is released at the point 50, it is grabbed by the second gathering unit 60 and fed rearwardly. Proximate to the time of gathering the crop material by the second gathering unit, the sickle 86 severs the material from the ground so that it may be fed into the harvester. The gathering chains 61 and 62 operate at a faster speed than the first gathering unit and the butt ends of the crop material are rapidly delivered upwardly and rearwardly and spread laterally beneath infeed roll 82. Thus the material is fed butt end first beneath the roll 82 and to the infeed rolls 26 and 28.

To assist in guiding crop material toward infeed roll 82, there is mounted on top of the rear portions of the dividers 32 and 34 a guide tube 90 which is U-shaped when viewed in plan. Tube 90 has a bight portion 91 which is vertically spaced from and located rearwardly of the axis of rotation of infeed roll 82. The side legs 92 and 94 of the guide tube extend forwardly along the outsides of the dividers. Each side leg has a curved forward end 95 which is located at a slightly higher elevation than the bight portion 91 of the guide tube. Each curved portion 95 blends with its associated divider member to provide a continuous smooth surface.

Guide tube 90 is so located relative to the other operative structure of the harvester, that it in no way interferes with the infeed of material. By locating the bight portion 91 rearwardly of the infeed roll 82, instead of forwardly as is conventional, the movement of crop material into the infeed structure is not impeded by the structure. Further, even if the crop material is extending left or right of the divider members, as it moves through the infeed passage 35, it will freely slide over the side legs 92 and 94 and ultimately to the bight portion 91 if it has not already been swept downwardly and inwardly by the infeed roll 82.

When the crop material is down and tangled, it is desirable to provide means for lifting and dividing the material before it is engaged by the divider adjacent the standing crop. If the harvester is traveling with the divider 32 adjacent the crop, such divider is provided with a down material attachment 100 which comprises a fore-and-aft extending tube 101 having a forward end 102 adjacent the ground and connected to a ground shoe 103. The ground shoe 103 extends diagonally and is suitably connected at 104 to the forward end 32' of the divider 32. The angular or diagonal extension of the shoe 103 relative to the direction of travel is the same as the forward portion of the divider inboard edge. Guide tube 102 extends upwardly and rearwardly at a lower angle than the divider 32, FIG. 1. It curves downwardly in section 105 adjacent and laterally spaced from the forward ends 95 of the guide tube legs 92 and 94. The rear or terminal end 106 of tube 101 is rearwardly of bight portion 91 of tube 90. Suitable bracket support structure 106 is provided for supporting tube 101.

Tube 101 serves as a lifter bar to slide beneath down and tangled crop material and to elevate it and divide stalks in the row being cut from the stalks in the adjacent row and to guide the material laterally toward the divider 32 as the harvester travels forwardly. Material in passage 35 and extending laterally toward the right of the machine as the machine travels forwardly, is jointly supported on the leg 92 and tube 101. This prevents bending or hairpinning of the crop around leg 92. When the material is released by the gathering unit 60 and engaged by the infeed roll 82, the material is swept inwardly and beneath the infeed roll 82 and into the harvester. The rearwardly extending portion 106 of tube 101 provides for support of the material even when such material is laterally and rearwardly of the bight portion 91 of tube 90. The overall structure is such that the ground speed of the machine does not have to be decreased when the attachment 100 is in use.

The down material guide tube 101 is used when the material is bent and tangled, and cooperates with the U-shaped guide tube 90. However, when the material is erect but unusually tall, attachment 100 is not needed, although it may be left on the machine if desired. In tall crops a bumper 110 is desirable and is provided. Bumper 110 extends between the legs 92 and 94 above infeed passage 35. The bumper is substantially forwardly of the infeed roll 82 and prevents material from passing over the top of the machine. In order to provide for the free and unobstructed movement of material to infeed roll 82, bumper 110 is supported on a pair of rearwardly and then downwardly extending support arms 111 which provide a space 109. The lower rear ends of arms 111 are connected to the bight portion 91 as shown best in FIGS. 3–5.

The arms 111 are centrally located on bight 91 to thereby leave the curved sides of guide tube 90 free and unobstructed. Each arm 111 has a bracket 112 affixed to it by welding or the like. Each bracket has two end portions 114 each of which has an arcuate pocket 115 which receives the bight 91. Wrapped around bight 91 is a strap 116 which extends diagonally relative to the axis of the bight. The strap is connected to bracket 112 by threaded bolt sections 118 which are welded to the strap and which project through bracket 112 and are fastened thereto by bolts 119. By having strap 116 extending diagonally, rather than perpendicular to the axis of the bight portion, the bolts 119 extend alongside arms 111 thereby reducing the overall width of the support structure. Also, the small size of the fastening structure makes it less susceptible to catching onto crop material, causing wrapping. By loosening nuts 119, the arms 111 can be axially and angularly adjusted relative to the bight portion 91 and thereby the position of the bumper 110 can be varied. Angular adjustment increases or decreases the size of space 109. Axial adjustment properly positions the bumper relative to the dividers.

With the structure described, the U-shaped guide member 90 provides the main guiding of material into the harvester. It is of particular significance that the bight portion 91 is rearwardly of the infeed roll 82. The attachment 100 is used when the material is down and tangled and operates to separate, lift and guide it to the inboard divider 32. In fields where part of the crop is tall and erect, and part is down and tangled, attachment 100 and bumper 110 may both be used and neither one will interfere or impair the operation of the other. Tangled crops slide over divider 32 and tube 101, being jointly supported by both parts. The material moves through space 109, beneath bumper 110, and is not hampered by the bumper. Also, in portions of the field having tall straight crops, the bumper functions with no interference from the divider.

While this invention has been described in connection with a particular embodiment thereof, it will be understood that it is capable of further modification, and this application is intended to cover any variations, uses, or adaptations following, in general, the principles of the invnetion and including such departures from the present disclosure as come within known or customary practice in the art to which the invention pertains, and as fall within the scope of the invention or the limits of the appended claims.

Having thus described my invention, what I claim is:

1. A row crop harvester comprising, in combination, a frame adapted to travel forwardly, a pair of dividers mounted on said frame in laterally spaced relation and defining an inlet passage for standing crop material such as corn, endless gathering means on said dividers, crop severing means supported on said frame and extending across a lower portion of said inlet passage, an infeed roll on said frame extending across said inlet passage and having a transverse axis spaced vertically and rearwardly from said severing means, said gathering means being operative to engage and convey crop material rearwardly and beneath said infeed roll, means rotating said infeed roll to feed said crop material downwardly and into said harvester, a U-shaped guide mounted on said frame above said infeed roll, said guide having a transverse bight extending in a horizontal plane and located rearwardly of a portion at least of said infeed roll and a pair of legs extending forwardly from said bight portion, one leg over each divider, said inlet passage directly in front of said infeed roll being unobstructed except for said gathering means and the portion of the inlet passage directly in front of said bight portion of said U-shaped guide and in said horizontal plane being wholly unobstructed to facilitate movement of crop material to and beneath said infeed roll.

2. A row crop harvester as recited in claim 1 wherein a stalk bumper is provided which extends across said inlet passage between said legs of said guide and vertically spaced from the legs, support means being connected to the stalk bumper and extending rearwardly and then downwardly therefrom and connected to said bight portion of said guide to thereby support the bumper.

3. A row crop harvester as recited in claim 2 wherein said legs are connected to a central portion of said bight portion whereby the lateral ends of the bight portion are free and unobstructed for the guiding of crop material.

4. A row crop harvester as recited in claim 2 wherein means is provided for connecting said support means to said bight of said guide for angular and axial adjustment relative thereto.

5. A row crop harvester as recited in claim 4 wherein said connecting means comprises a strap engaging said bight and extending diagonally relative to the axis of the bight.

6. A row crop harvester as recited in claim 1 wherein a lifter bar extends alongside one of said dividers and laterally spaced relative thereto, the forward end of said bar being adjacent the ground, and means for supporting said bar on said one divider.

7. A row crop harvester as recited in claim 6 wherein said lifter bar extends from a forward end adjacent to ground upwardly and rearwardly, having a forward portion forwardly of said one divider and a rearward portion spaced vertically above the adjacent leg of said U-shaped guide and terminating rearwardly of the bight portion of the guide.

References Cited in the file of this patent

UNITED STATES PATENTS

| | | |
|---|---|---|
| 2,442,520 | Van Sickle | June 1, 1948 |
| 2,518,732 | Tuft | Aug. 15, 1950 |
| 2,629,978 | Krauss et al. | Mar. 3, 1953 |
| 2,651,162 | Whisler | Sept. 8, 1953 |
| 2,751,744 | Reade et al. | June 26, 1956 |